United States Patent [19]

Kataoka

[11] 3,835,376

[45] Sept. 10, 1974

[54] METHOD AND APPARATUS FOR DETECTING UNEVEN MAGNETIC FIELD BY SWEEPING A PLASMA CURRENT ACROSS A SEMICONDUCTOR

[75] Inventor: Shoei Kataoka, Tokyo, Japan

[73] Assignee: Agency of Industrial Science & Technology, Tokyo, Japan

[22] Filed: Aug. 17, 1972

[21] Appl. No.: 281,408

[30] Foreign Application Priority Data

Aug. 20, 1971 Japan .................................. 46-62929
Sept. 20, 1971 Japan .................................. 46-72459

[52] U.S. Cl. ................ 324/43 R, 324/45, 338/32 H, 340/174

[51] Int. Cl. ............................................ G01r 33/06

[58] Field of Search ..................... 324/43 R, 45, 46; 338/32 R, 32 H; 340/174 R

[56] References Cited

UNITED STATES PATENTS

| | | | |
|---|---|---|---|
| 3,003,105 | 10/1961 | Kostyshyn | 324/45 |
| 3,286,161 | 11/1966 | Jones et al. | 324/45 |
| 3,691,540 | 9/1972 | Almasi et al. | 340/174 TF |
| 3,701,126 | 10/1972 | Reichard | 340/174 TF |

FOREIGN PATENTS OR APPLICATIONS

| | | | |
|---|---|---|---|
| 1,018,539 | 10/1957 | Germany | 324/45 |

OTHER PUBLICATIONS

Strauss, et al.; Hall Effect Domain Detector; Journ. of Applied Physics; Vol. 41, No. 3, Mar. 1970, pp. 1169–1170.

Bailot et al.; Magnetic Bubble Sensing; IBM Tech. Bull. Vol. 13, No. 10; Mar. 1971, pp. 3100–3101.

Arnett et al.; Two Drain FET Mayfield Sensor; IBM Tech. Bull. Vol. 13, No. 12; May 1971, p. 3633.

*Primary Examiner*—Robert J. Corcoran
*Attorney, Agent, or Firm*—Kurt Kelman

[57] ABSTRACT

The invention disclosed provides a semiconductor device and method whereby an inverted magnetic field such as a magnetic bubble is detected by placing the semiconductor device having at least two electrodes on a magnetic body, allowing a filamentary or plasma current to sweep in the semiconductor from a first input electrode, confining the filamentary current at the boundary of a detected inverted magnetic field, and detecting the position of the inverted magnetic field by means of an output electrode through which the filamentary or plasma current flows.

21 Claims, 40 Drawing Figures

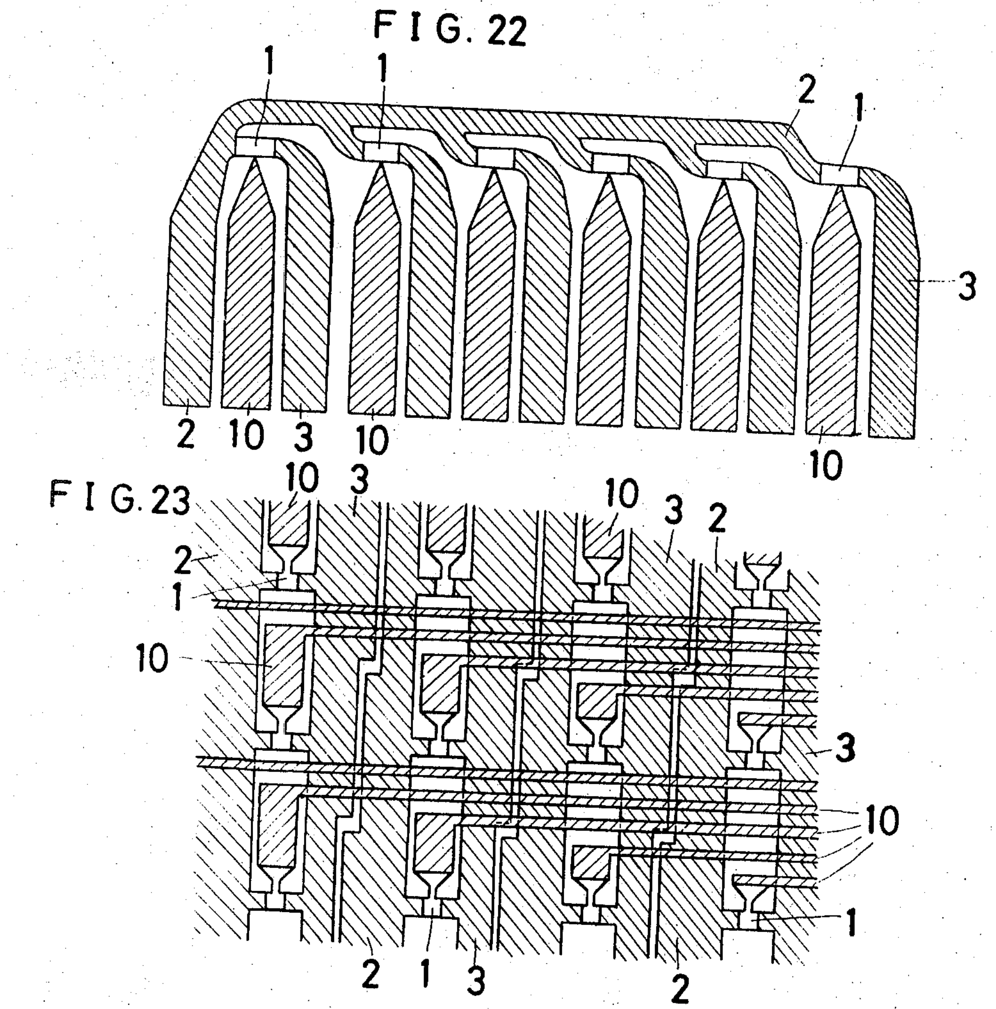
FIG. 22, FIG. 23
FIG. 27
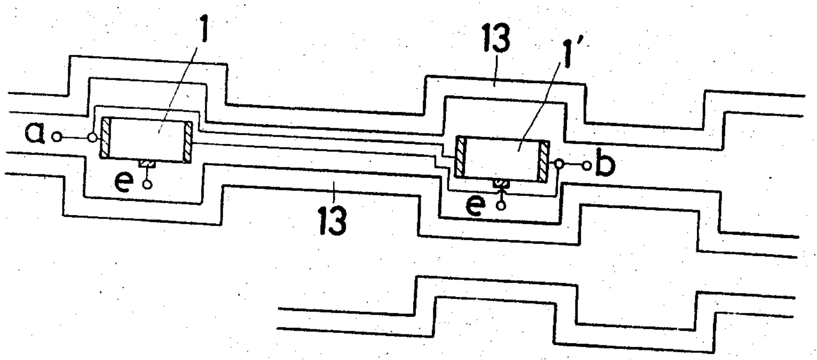

METHOD AND APPARATUS FOR DETECTING UNEVEN MAGNETIC FIELD BY SWEEPING A PLASMA CURRENT ACROSS A SEMICONDUCTOR

This invention generally relates to method and apparatus for detecting uneven magnetic field, and more particularly to method and apparatus for electrically detecting the existence of a local inversion of magnetic field such as magnetic bubble domain.

Recently it has been found that a local inversion of magnetic field or magnetic bubble exists in an orthoferrite or garnet element subjected to a bias magnetic field and the art of applying this phenomenon to memory or logic operation has been developed. The conventional method for electrically detecting magnetic bubble domains uses the Hall effect of semiconductor or the magnetic resistive effect of semiconductor or magnetic elements.

As for the detecting method using the Hall effect of semiconductor, a semiconductor element whose active area is made smaller than the dimensions of the magnetic bubble is used to detect the magnetic field from the magnetic bubble. In this connection the size of the semiconductor element varies with the size of the magnetic bubble. The semiconductor device to be used for detecting a relatively small magnetic bubble must be accordingly reduced in size, and therefore difficulties arise in producing suitable semiconductor elements. Also, disadvantageously, the detected output signal decreases with the smallness of the element, and accordingly the signal-to-noise ratio decreases until such small element is, by way of example, useless for detecting a minute magnetic bubble as small as 5 $\mu$m in garnet.

The conventional method uses four-terminal Hall elements. This makes it actually impossible to build a two-dimensional array to detect magnetic bubbles if any, in two dimensional space owing to the complexity of the wiring.

The main object of this invention is to provide a method for detecting uneven magnetic field in which a magnetic field in a given fixed direction and an inverted magnetic field coexist, by using the newly found galvano-magnetic effects of semiconductor devices.

Another object of this invention is to provide a method for digitably or analogously detecting magnetic bubbles in the magnetic body which method permits the use of a large semiconductor element compared with the magnetic bubble to be detected.

Another object of this invention is to provide an apparatus for detecting uneven magnetic field which apparatus facilitates the building of a two-dimensional array structure.

Another object of this invention is to provide a method for electrically detecting the position of magnetic bubble domains in the magnetic body without shifting the magnetic bubbles.

Another object of this invention is to provide a method for digitably or analogously and simultaneously detecting the position of a pluraltiy of magnetic bubbles.

Another object of this invention is to provide a system to perform logic operations in the course of detecting magnetic bubble domains.

The method for detecting uneven magnetic field according to this invention comprises the steps of: subjecting locally one or more semiconductor devices each having at least two electrodes to reversed magnetic fields, applying a voltage or current to the input electrodes of the semiconductor devices and detecting the voltage or current appearing across the output electrodes of the semiconductors.

Other objects and features of this invention will be obvious from the following description which is made with reference to the attached drawings in which:

FIGS. 22 and 23 are plan views of an array pattern of three-terminal Hall elements.

FIG. 24 is an explanatory drawing which shows one embodiment for carrying out logic operations using three three-terminal Hall elements.

FIGS. 25 through 27 show a method for noise elimination adaptable to the detector of this invention.

Figures 1, 2, 3, 4, 5:
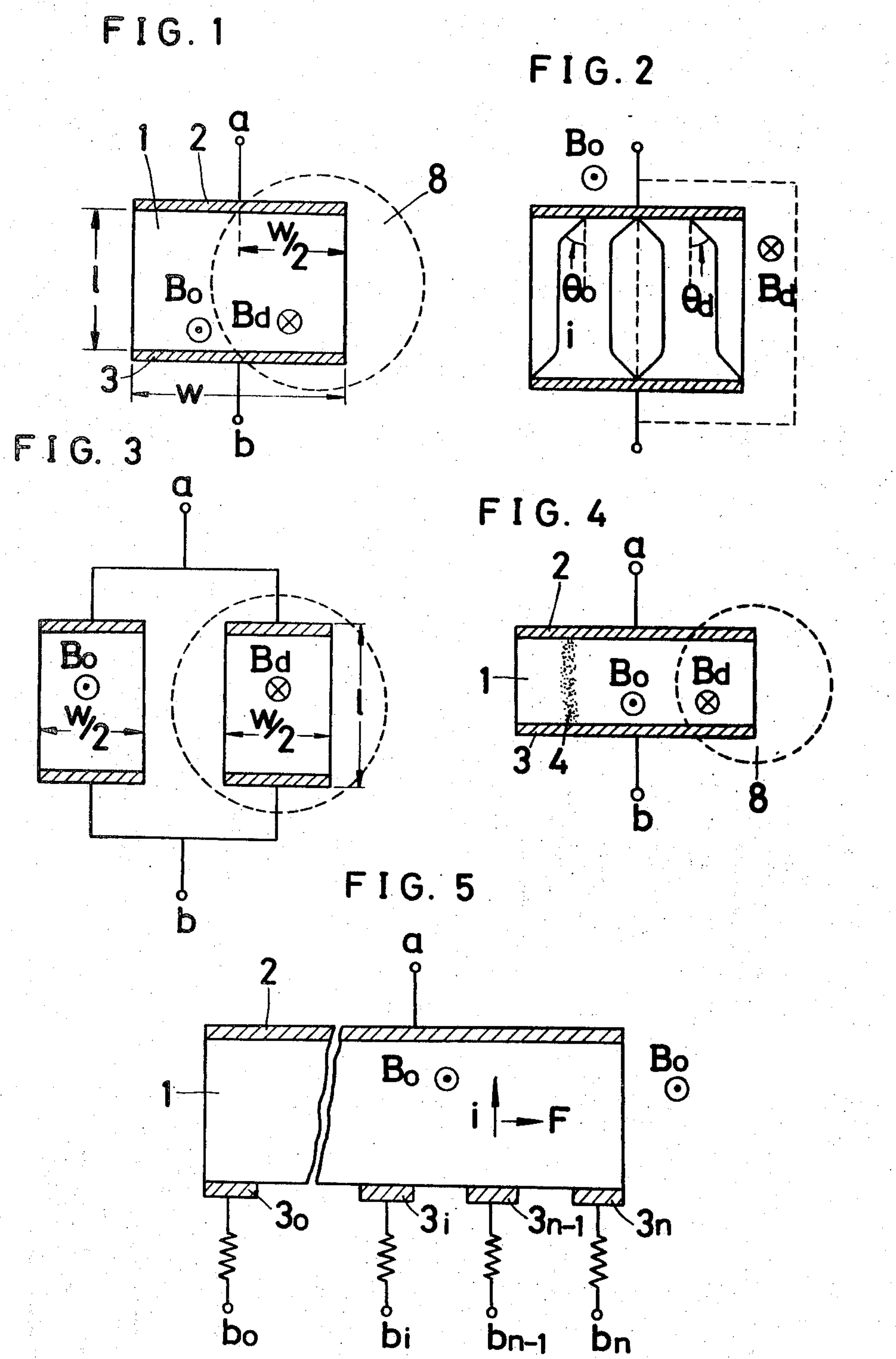
FIG. 1 is an explanatory view showing a method for detecting uneven magnetic field by using a two-terminal semiconductor device.
FIG. 2 is an explanatory view which shows the principle of the detecting method shown in FIG. 1.
FIG. 3 is an explanatory view showing an arrangement equivalent to the semiconductor device of FIG. 1 when operated.
FIGS. 4 to 11 are explanatory views showing other embodiments for detecting uneven magnetic field by using a two-terminal semiconductor device according to the method of the present invention.

Referring to FIG. 1, an embodiment of this invention using a two-terminal semiconductor device is shown. A semiconductor body 1 is shown as having two electrodes 2, 3 on opposite sides in this figure. This device is put on a magnetic body, and the device is subjected to the magnetic field $B_o$ in the direction perpendicular to the device.

If an inverted magnetic field $B_d$ due to a magnetic bubble 8 existing in the magnetic body should cut across the electrodes 2, 3, the current will flow at opposite Hall angles of inclination $\theta_o$, $\theta_d$ with respect to the electrodes as shown in FIG. 2. This is because the direction of the magnetic field in the left half of the semiconductor body 1 is opposite to the direction of the magnetic field in the right half of the device. Thus, the current will flow in a distributed pattern symmetric with respect to the boundary between the inverted magnetic field and the bias magnetic field. The semiconductor device is equivalent to the parallel-connected two-terminal semiconductor devices as shown in FIG. 3. As is readily understood, the ratio of resistance increase due to magnetic resistance effect largely depends upon the ratio of the width $w$ of the element to the length $l$ between the electrodes of the element, and is substantially proportional to $w/l$. Therefore, the device of FIG. 1 when partially subjected to an inverted magnetic field $B_d$ will be equivalent to the parallel connection of two half-width devices ($w/2$), and the ratio resistance increase will lower, compared with that when the device is subjected only to uniform magnetic field $B_o$. When the magnetic bubble in the magnetic body, i.e., the inverted magnetic field $B_d$, is almost as strong as the uniform bias magnetic field $B_o$, the increase in resistance will reduce by half. Therefore, the magnetic bubble can be easily found by allowing electric current to flow through the device to detect the decrease of resistance in the form of voltage. The actual results are given in the following:

The semiconductor used was n-type InSb; length between the electrodes 60 $\mu$m, width 50 $\mu$m, thickness 5 $\mu$m, and input resistance 60 $\Omega$ (no magnetic field). This semiconductor device was used to detect a magnetic bubble as large as 130 $\mu$m in diameter appearing in orthoferrite $YFeO_3$ when subjected to a bias magnetic field as strong as 20 oersted. When the magnetic bubble is situated in the same manner as shown in FIG. 1, the resistance decreased by about 0.1 $\Omega$. This decrease was detected in the form of output voltage (about 1 mV) when electric current (about 10 mA) was allowed to flow through the device.

The phenomenon above mentioned is most conspicuous when a plasma current 4 flows through the semiconductor body 1. If a high voltage beyond the threshold value should be applied to the ohmic or injection electrodes 2, 3 of the semiconductor body 1, a plasma current 4 will flow through the semiconductor in the form of a fine stream 4 (FIG. 4). This occurs when the material of the semiconductor presents negative conductance characteristic current control type. This filamentary current 4 is composed of electrons and positive holes and, therefore, no Hall electric field will appear in the semiconductor when it is subjected to magnetic field in the perpendicular direction, and the filamentary current is influenced by the Lorentz force in the most effective fashion. More specifically, the filamentary current 4 will be subjected to a transverse force by the bias magnetic field (no inverted magnetic field in the semiconductor device) and to one edge or the other of the semiconductor body. In case of the existence of a locally inverted magnetic field 8 in the semiconductor device, however, the filamentary current will be confined at the boundary between the inverted magnetic field and the bias magnetic field. This is because Lorentz force will act on the filamentary current in the opposite direction in the respective magnetic fields.

Figure 6:
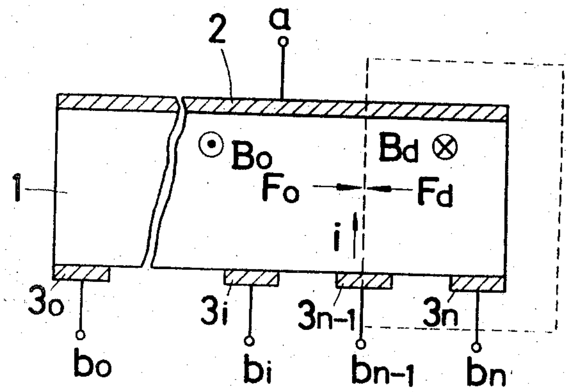

Referring to FIG. 5, a semiconductor device is shown as having one electrode 2 on one end and a plurality of separated electrodes $3_o$, $3_i$, $3_{n-1}$ and $3_n$ on the other end. If a voltage beyond a certain threshold value is applied across the opposite electrodes 2, 3 a filamentary current will be produced in the semiconductor body 1. Then, the semiconductor device is subjected to magnetic field $B_o$ perpendicular to the device so that Lorentz force F acts on the electrons and positive holes in the transverse direction. As shown in FIG. 5, the electric current will be shifted to the right with the result that the electric current will flow only along the path running from the counter electrode $3_n$ to the electrode 2. However, if an inverted magnetic field $B_d$ exists in the semiconductor device (See FIG. 6), the transverse forces $F_o$ and $F_d$ in the bias magnetic field and the inverted magnetic field will be opposite to each other, and therefore the filamentary current will be confined at the boundary. Obviously, the boundary of the inverted magnetic field intersects the electrode through which the electric current flows. Thus, the position of the inverted magnetic field can easily be detected by determining in which electrode the electric current flows.

Figure 7:
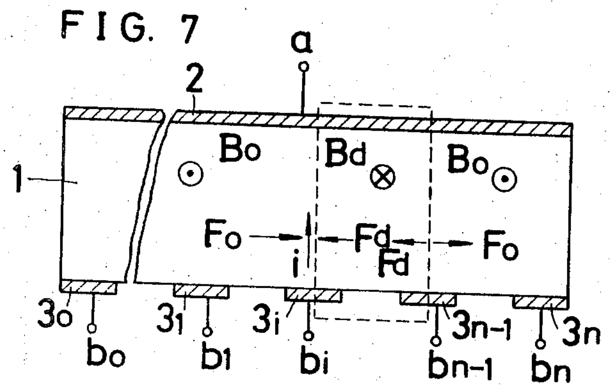

In case that an inverted magnetic field $B_d$, such as a magnetic bubble, is situated in the middle region of the semiconductor device as shown in FIG. 7, the Lorentz forces $F_d$ and $F_o$ will act on the electric current and confine the same at the left boundary, but the Lorentz forces will act on the electric current at the right boundary in a different fashion, causing the electric current to be dispersed. Thus, the position of the magnetic bubble can be detected by determining in which electrode the electric current flows. In this particular case such electrode is electrode $3_i$.

Figure 8:
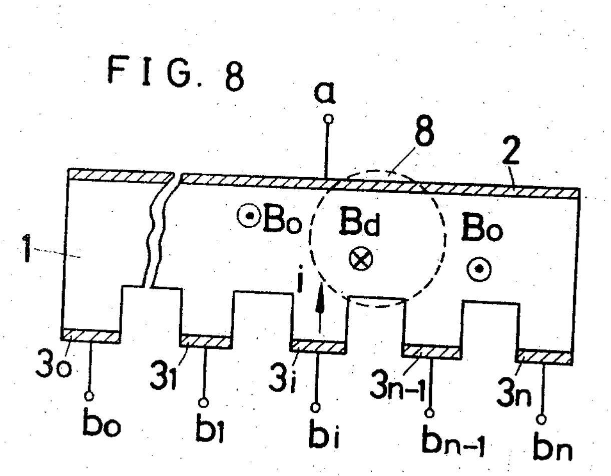

FIG. 8 shows an embodiment which can detect a magnetic bubble if any, in a more effective way than the device shown in FIG. 7. This semiconductor device has a common electrode on one end and, a plurality of counter electrodes provided on the projections extending from the other end. If this indented semiconductor is put on a magnetic body, and if the magnetic body has a magnetic bubble 8, the filamentary current will flow through the electrode which is situated at one of the boundaries of the magnetic bubble.

As a matter of course, it simply depends upon the direction of the current and the magnetic field which side of the magnetic bubble the electric current is confined. In case that two or more magnetic bubbles act on the semiconductor device, the filamentary current will flow through as many electrodes as the magnetic bubbles.

A semiconductor with electric negative-conductance of current control type may be used, as for instance Ge, Si, GaAs, p-type InSb and other similar materials. The electrodes may be of the ohmic contact type. However, electrodes capable of injecting electrons and positive holes into the semiconductor body ($n^+$ electrode for p-type semiconductor body, $p^+$ or $n^+$ electrode for the intrinsic semiconductor body) may be used for better results.

Figure 9:
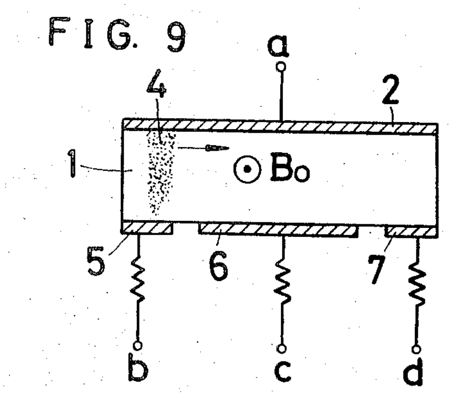
Figure 10:
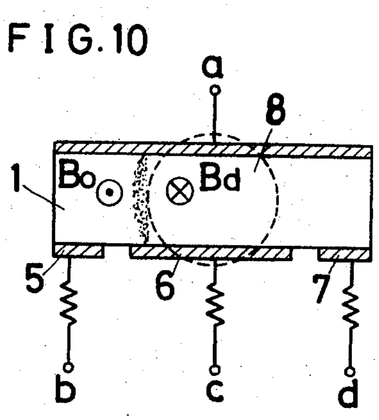

In the embodiment given in FIG. 9 the semiconductor body 1 has a common electrode 2 on one end and three different counter electrodes 5, 6 and 7 on the other end. These counter electrodes constitute a filamentary current producing electrode 5, filamentary current sweeping electrode 6 and filamentary current collector electrode 7. If a voltage beyond a certain threshold value is applied across the electrodes 2 and 5, a filamentary current 4 will appear within the semiconductor body. If the semiconductor device is subjected to a magnetic field in the direction perpendicular to the semiconductor body, the filamentary current will be shifted in the direction perpendicular to the magnetic field because the Lorentz force acts on the electrons and the positive holes in the same direction. If, for instance, the magnetic field $B_o$ is directed from the back to the front side of the drawing paper, the force will act on the filamentary current to the right. If a voltage beyond a certain threshold value is applied across the electrode 2 and 6 and across the electrodes 2 and 7, the filamentary current 4 will be shifted to the right in FIG. 9. If the semiconductor device is put on a magnetic body in which a magnetic bubble 8 exists, the magnetic field will be locally inverted at the corresponding part to the magnetic bubble as shown in FIG. 10. Then, the filamentary current 4 will be confined at the boundary of the inverted magnetic field because the Lorentz force caused by the magnetic bubble is opposite to the Lorentz force caused by the bias magnetic field. As is apparent from the above, if there is provided on one end of the semiconductor body 1 a filamentary current sweeping electrode 6 almost as large as the whole end of the semiconductor body, this electrode 6 will be responsive to the filamentary current when it is confined at the boundary of a magnetic bubble. Electric current flowing from the sweeping electrode 6 to a detecting means such as a resistor series-connected to the sweeping electrode can be used to detect a magnetic bubble, if any, in the semiconductor body. It should be notedthat, in case there exist a plurality of magnetic bubbles in the semiconductor body, the magnetic bubble thus detected is the one which, in the course of shifting, the filamentary current meets first.

If there exists no magnetic bubble in the semiconductor body, and if only a uniform magnetic field is applied to the whole semiconductor body, the filamentary current will be driven to the right until it has reached and stays at the collector electrode 7, and then electric current will flow through the collector electrode but little or no electric current will flow through the sweeping electrode 6. If there exist a plurality of magnetic bubbles 8 in the semiconductor body 1 as shown in FIG. 11, the filamentary current will stay at a certain position in the sweeping area to cause electric current to flow through the sweeping electrode 6 as is the case in the existence of a single magnetic bubble 8, thus detecting at least one of the magnetic bubbles.

An actual example is as follows:

As a semiconductor body a p-type InSb was used, the width of the body was about 2.5 mm, and the length between the electrodes was 700 $\mu$m. One of the electrodes was applied to one end of the body whereas the other three electrodes were applied to the other end. The semiconductor device was subjected to the magnetic field as strong as 1 k gauss. It was found that 90 percent of the whole current flowed through a particular electrode, the position of which was on the right or left depending on the direction of magnetic field. Also, it was found that when an inverted magnetic field was applied, the filamentary current stayed at the boundary thereof.

Figure 11:
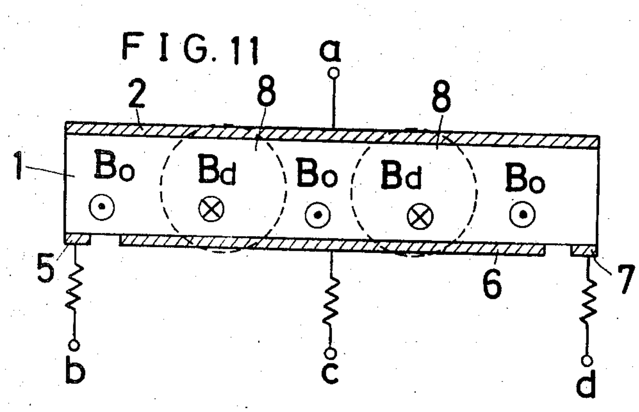

The plurality of elongated semiconductor elements of FIG. 11 are arranged in parallel on a magnetic body, and if the magnetic body should contain magnetic bubbles, electric current will flow through the sweeping electrode 6 of the element which lies on the magnetic bubble 8, thus detecting the existence of at least one magnetic bubble in the particular row in which the element lies.

Figure 12:
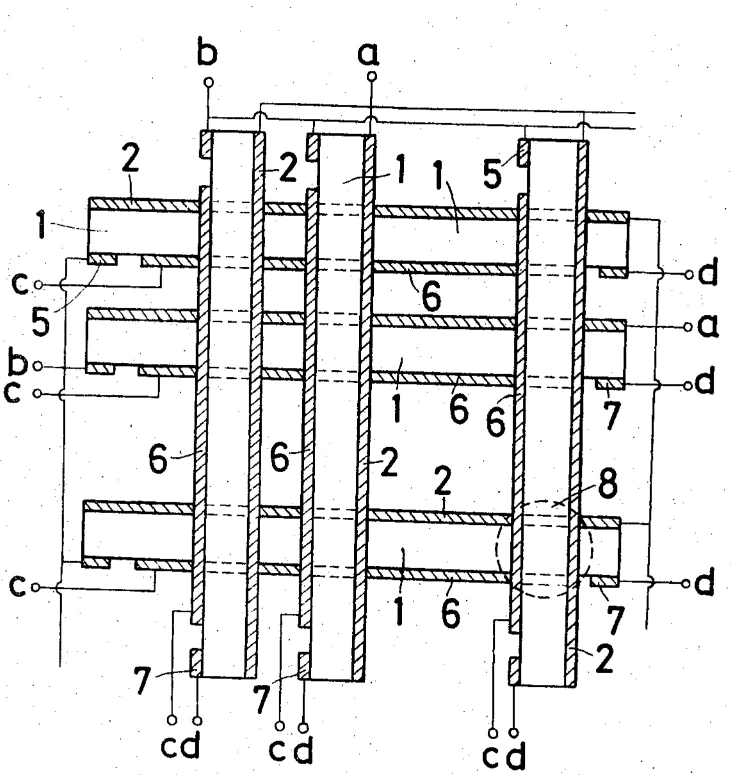
FIG. 12 is an explanatory view showing a matrix comprising a plurality of devices of the type shown in FIG. 9.

Likewise, if a plurality of elongated elements 1 are arranged in a matrix on a magnetic body as shown in FIG. 12 and a magnetic bubble 8 is situated at the crossing position of the particular elements, then an electric current will flow through the sweeping electrodes 6 of the particular elements. Thus, if there exist a plurality of magnetic bubbles in the magnetic body, their positions can be easily detected.

A plurality of elongated elements may be arranged in the circular-and-radial form or any other desired form if it permits the detection of a magnetic bubble at the crossing point.

As is apparent from the above, the method of detecting an inverted magnetic field comprises the steps of putting a semiconductor device having electrodes on a magnetic body; allowing the filamentary current to sweep in the semiconductor; confining the filamentary current at the boundary of inverted magnetic field; and determining through which electrode the filamentary current flows thereby detecting the position of the magnetic bubble in the magnetic body. If a train of voltage pulses are applied across the electrodes to allow the filamentary current to sweep the interior of the semiconductor at regular time intervals, the magnetic bubble will be detected in terms of time.

In case that an inverted magnetic field is applied to cut across the free sides (sides having no electrodes) of a semiconductor device having two end electrodes (See FIG. 13), the directions of magnetic field are opposite in the upper and lower halves of the semiconductor device, and therefore the Hall angles, the inclination angles of electric current, will be opposite. This is electrically equivalent to a semiconductor device having a metal boundary 9 at the same position as the boundary of the inverted magnetic field. More specifically, in FIG. 13(B) an equivalent device is shown as series-connected elements, each element being as long as $l/2$ and as wide as $w$. Accordingly, the ratio of resistance increase will be twice as large as for an element having the dimension of $l$ by $w$. Thus, if the strengths of the magnetic fields $B_o$ and $B_d$ are substantially equal to each other, the ratio of resistance increase of the element will be doubled by the inverted magnetic field (FIG. 13(C)). Therefore, if electric current is passed through the element, this increase of resistance can be detected in the form of an increase in voltage across the electrodes. Thus finally the inverted of magnetic field can be detected.

Figure 14:
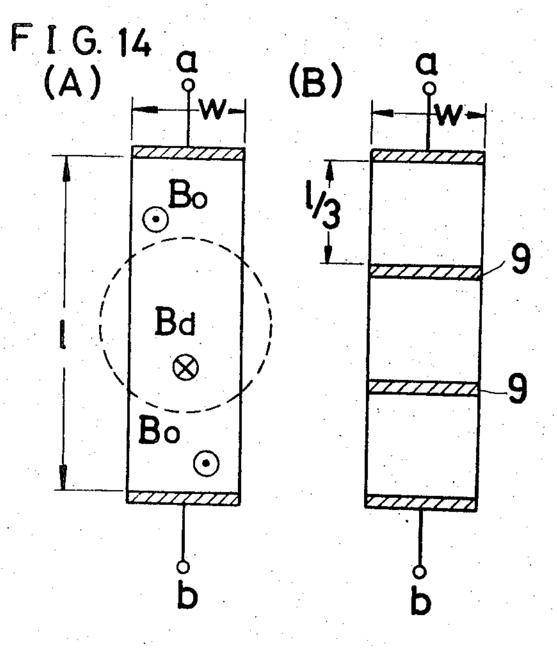
FIGS. 13 and 14 are explanatory views showing other embodiments for detecting uneven magnetic field by using a two-terminal semiconductor device according to the method of the present invention.
Figure 13:
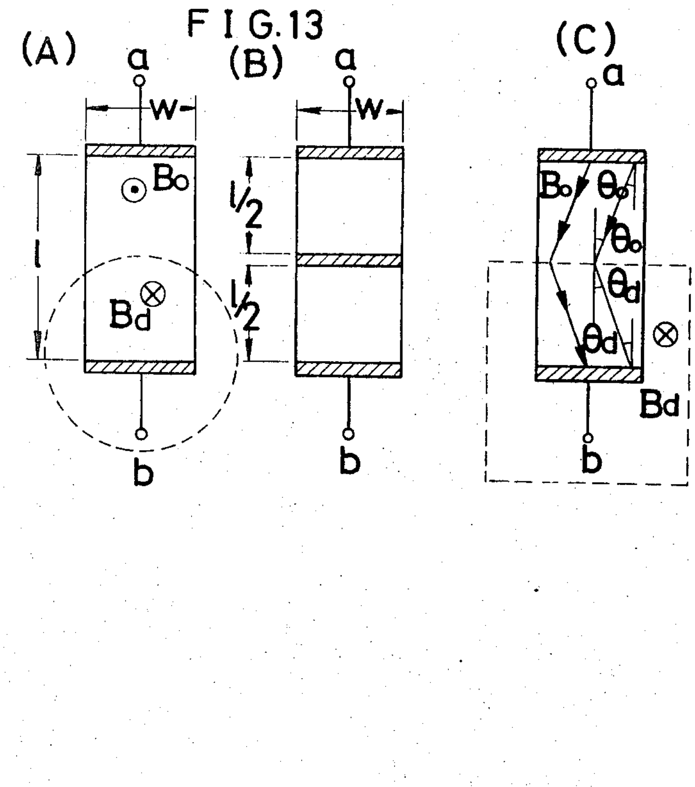

Referring to FIG. 14, there appears an inverted magnetic field $B_d$ in the middle portion of the element with the result that the element has two pseudo-metal boundaries 9. In this case the ratio of resistance increase of the element will triple. Thus, since the ratio of resistance increase is proportional to the number of boundaries of inverted magnetic fields, the number of magnetic bubbles can be counted with an elongated semiconductor element. Actual experimental results are given as follows:

A semiconductor body was made of n-type InSb; length between electrodes 60 $\mu$m, and thickness 5 $\mu$m. The input resistance of the element was 60 $\Omega$. In the same way as shown in FIG. 13, this element was put on a magnetic bubble in $YFeO_3$ under a bias magnetic field of 20 oe. As a result the resistance of the element increased by about 0.1 $\Omega$, and this increase was detected as a voltage drop as large as about 1 mV at electric current of 10 mA.

Figures 15, 16:
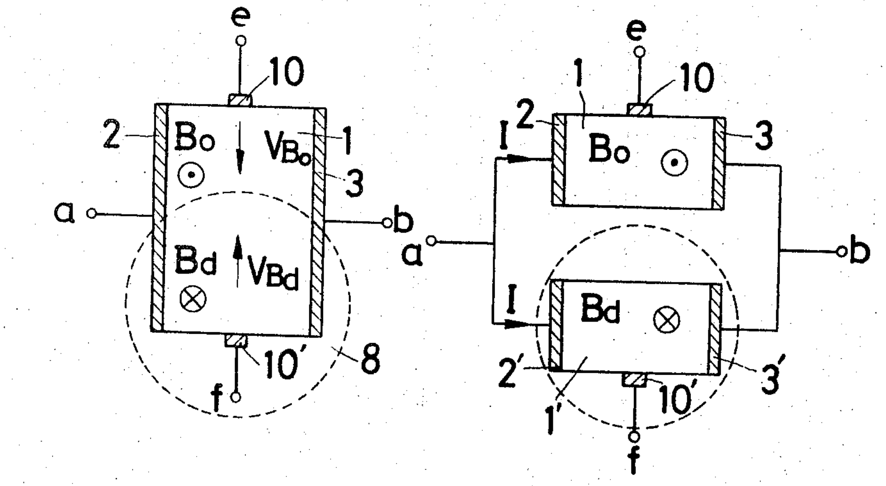
FIG. 15 is an explanatory drawing which shows the principle of the method for detecting uneven magnetic field by using a four-terminal Hall element according to the method of the present invention.
FIGS. 16 to 18 are explanatory views showing methods for detecting uneven magnetic field by using three-terminal Hall elements according to the method of the present invention.

Referring to FIG. 15, a four-terminal Hall semiconductor device is now described. The device 1 has current electrodes 2, 3 on the opposite major ends and output Hall electrodes 10, 10′ on the opposite sides. If this device is subjected to a uniform magnetic field $B_o$, a Hall output voltage will appear across the Hall electrodes 10, 10′. If it is subjected to an inverted magnetic field $B_d$ the boundary of which cuts across the current electrodes, two different Hall electromotive forces $V_{BO}$ and $V_{Bd}$ opposite in polarity will appear in the upper and lower halves of the device because the magnetic fields in the halves are opposite to each other. If the uniform bias magnetic field $B_o$ is equal to the inverted magnetic field $B_d$ both in strength and in area, the two Hall electromotive forces will be cancelled, thus producing no Hall voltage across the output electrodes 10, 10′. Therefore, the four-terminal Hall semiconductor device is equivalent to a parallel connection of two three-terminal elements formed by separating the four-terminal device at the boundary of invertednagnetic field (See FIG. 16). If either but not both of the parallel-connected elements 1, 1′ is subjected to a inverted magnetic field, little or no voltage will appear across the output electrodes 10, 10′. Contrary to this, if both elements are subjected to inverted magnetic field only or to bias magnetic field only there will be a substantial output voltage. Consequently, it is possible to determine the presence of an inverted magnetic field in one or the other of the elements by absence of a substantial output voltage. The same effect can be obtained with the parallel-connected elements of FIG. 17 which are the same as those of FIG. 16 except for the relative positions of the output electrodes (c.f. FIG. 16).

This parallel-connection not only can detect the presence of an inverted magnetic field (magnetic bubble), but also can perform logic operations using magnetic bubbles.

A discussion now follows of several devices comprised of parallel connected elements of the same material and configuration.

Figure 17:
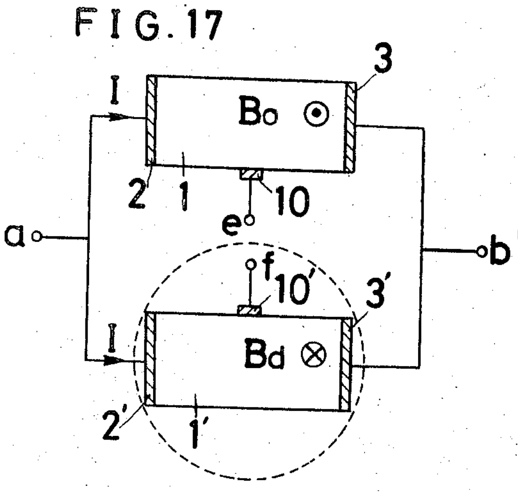

Referring to FIG. 17, an AND circuit using the parallel-connection as mentioned above is described as follows. In this device the output electrodes of the elements are positioned on opposite sides of the respective elements with respect to the direction of the electric current. Accordingly, if element 1 is subjected to a bias magnetic field $B_o$ and element 1′ is subjected to an inverted magnetic field $B_d$ due to a magnetic bubble, and if the potential of the electrodes 2, 2′ of both element is taken as zero, the potential of the output electrode 10 of the element 1 is given by:

$$V_e = (V/2) + (R_H/2t)IB_o \tag{1}$$

where $V$ is the voltage applied across the terminals $a$, $b$; $R_H$ is the Hall coefficient of the semiconductor; $t$ is the thickness of the element and $I$ is the current through the element.

In view of the polarity of the Hall voltage of the element 1′ being opposite to that of the Hall voltage of the element 1, the potential of the output electrode 10′ of element 1′ is given by:

$$V_f = (V/2) - (R_H/2t)IB_d \tag{2}$$

Thus, the output voltage appearing across terminals "$e$" and "$f$" is given by:

$$V_{ef} = (R_H/2t)I(B_o + B_d) \tag{3}$$

As in practice, magnetic fields $B_o$ and $B_d$ are substantially equal in strength and opposite in direction, $V_{ef}$ is substantially zero.

If both elements are subjected to the bias magnetic field $B_o$ and there exists no magnetic bubble in either element, the outer voltage is given by:

$$V_{ef} = (R_H/t)IB_o \tag{4}$$

Thus viewed, the parallel-connection constitutes a NAND circuit of magnetic bubbles.

If there are magnetic bubbles on both elements, the output voltage is given by:

$$V_{ef} = (R_H/t)IB_d \tag{5}$$

In this case it functions as an AND circuit of magnetic bubbles. Since magnetic field $B_o$ is opposite to magnetic field $B_d$, it can be determined from the polarity of the output voltage whether the parallel-connection functions as a NAND circuit or an AND circuit.

Figure 18:
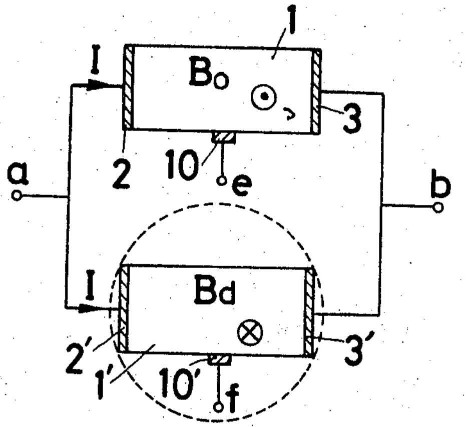

Referring to FIG. 18, a parallel connection having the output electrodes 10, 10′ provided on the same side of each element 1, 1′ with respect to the current is shown.

In this parallel-connection the output voltage will appear in a different way from that in the parallel-connection as mentioned above.

A three-terminal semiconductor element having current electrodes 2, 3 and an output Hall electrode 10 and a similar device 1′ having current electrodes 2′, 3′ and an output Hall electrode 10′ are in parallel-connection at their current electrodes, and the parallel assembly thus formed is connected to terminals "$a$" and "$b$." Assume that the magnetic fields passing through elements 1, 1′ are $B_o$ and $B_d$ respectively.

The potential $V_e$ appearing at the output electrode 10 of the element 1 passing the current $I$ is given by:

$$V_e = (V/2) + (R_H/2t)IB_o \tag{6}$$

Likewise, the potential $V_f$ appearing at the output electrode 10' of the element 1' passing a current "$I$" is given by:

$$V_d = (V/2) + (R_H/2t)IB_d \tag{7}$$

Accordingly, the voltage $V_{ef}$ appearing between the output electrodes 10 and 10' is given by:

$$V_{ef} = (R_H/2t)I(B_o - B_d) \tag{8}$$

As seen from this equation, if both elements 1, 1' are subjected to the same uniform magnetic field ($B_o = B_d$), no voltage will appear between the output electrodes 10 and 10'. Contrary to this, if the magnetic field to which these elements are subjected is not uniform ($B_o \neq B_d$), a voltage will appear between the output electrodes 10 and 10'.

The voltage is a function of the difference in the magnetic field strength and therefore it will be a measure of the unevenness of the magnetic field.

If one element of the parallel connection is subjected to a bias magnetic field $B_o$ and the other element is subjected to an inverted magnetic field $B_d$, the output voltage $V_{ef}$ is given by:

$$V_{ef} = (R_H/2t)I(B_o - Bd) = (R_H/2t)I(|B_o| + |B_d|) \tag{9}$$

If the absolute value of the bias magnetic field strength is nearly equal to that of the inverted magnetic field strength ($|B_o| \geqq |B_d|$), the output voltage is given by:

$$V_H = (R_H/d)IB_d \tag{10}$$

In no magnetic bubble exists in either element, the output voltage given by:

$$V = (R_H/d)I(B_o - B_o) = 0 \tag{11}$$

Thus a parallel connection of two three-terminal elements according to this invention will produce no output voltage for no magnetic bubble.

Figure 19:
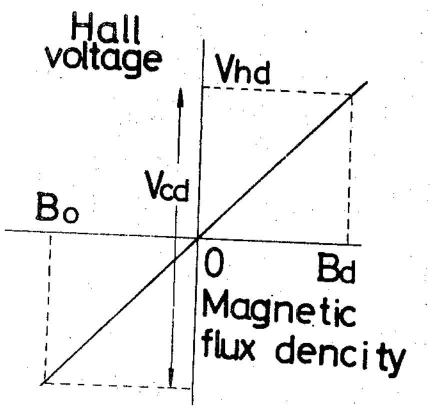
FIG. 19 is a graph showing the characteristics of a Hall element.

This will be discussed in detail by referring to FIG. 19 in which the characteristics of a Hall element are shown. In the conventional method using a single Hall element to determine the magnetic field $B_d$ from a magnetic bubble, the Hall element will give only $V_{Hd}$ as output signal. Compared with this, a connection of two three-terminal Hall elements according to this invention will give $V_{Hd}$ plus $V_{Ho}$ output signal, $V_{Ho}$ being generated by the bias magnetic field $B_o$. Thus, the parallel-connection of two three-terminal Hall elements will provide an output voltage substantially larger than the output voltage of the conventional detector.

It is not necessary to use three-terminal Hall elements of the same characteristics. Neither is it necessary to pass the same amount of electric current through both element devices. Assume that the product sensitivities of the Hall elements 10, 10' are K and K' respectively and that electric currents flowing through the elements 1, 1' are I and I'. The voltage $V_{ef}$ appearing between the output electrodes 10 and 10' is given by:

$$V_{ef} = \tfrac{1}{2}KIB_o - \tfrac{1}{2}K'I'B_d \tag{12}$$

As is apparent from this, no output voltage appears for the uniform magnetic field ($B_d = B_o$), if the following equation is satisfied;

$$KI = K'I' \tag{13}$$

Figure 20:
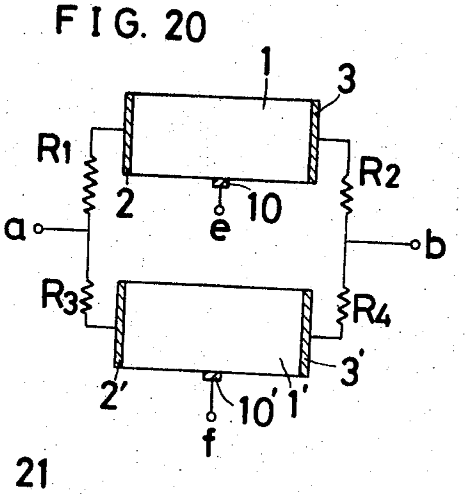
FIG. 20 and FIG. 21 are explanatory views showing other embodiments for detecting uneven magnetic field by using three-terminal semiconductor devices according to the method of the present invention.

The electric currents flowing through the Hall elements 1, 1' can be controlled to meet equation (13) by properly selecting the resistors $R_1$, $R_2$, $R_3$ and $R_4$ are series-connected to the elements as shown in FIG. 20.

A parallel-connection of elements thus controlled will produce the following output voltage $V_{ef}$ between the output electrodes 10, 10' of the elements for uneven magnetic field;

$$V_{ef} = \tfrac{1}{2}KI(B_o - B_d) \tag{14}$$

If no magnetic bubble exists, no output voltage will appear, and if a magnetic bubble exists on one of the elements 10, 10', the output voltage $V_{ef}$ is given by:

$$V_{ef} = \tfrac{1}{2}KI(|B_o| + |B_d|) \tag{15}$$

Figure 21:
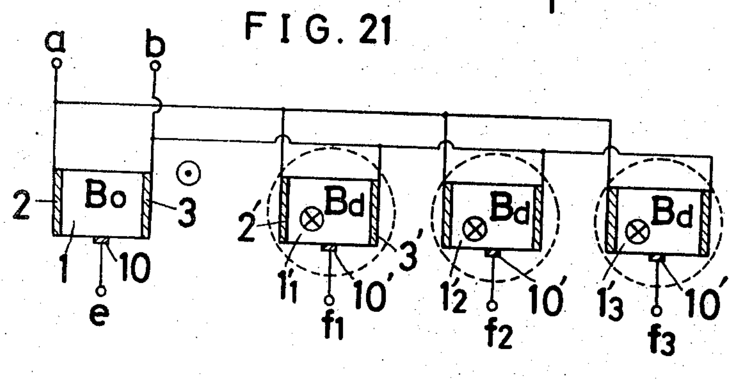

The number of the three-terminal Hall elements is not limited to two. This invention is equally applicable to three or more elments as required. If use is made of a plurality of elements, one of these elements can be subjected to a reference magnetic field, i.e., a bias magnetic field $B_o$ and used as a common reference unit. In FIG. 21, an array for detecting a plurality of magnetic bubbles is shown as comprising a plurality of three-terminal Hall elements arranged in a line. The element 1 positioned at the left end functions as a reference, and therefore only this element 1 is constantly subjected to the magnetic field $B_o$ so that a magnetic bubble will not appear on this reference element.

A number of three-terminal Hall elements $1'_1$, $1'_2$, $1'_3$ . . . are positioned on the right side of the reference element 1 at places where magnetic bubbles may appear. The current electrodes of these elements are connected in parallel to terminals "$a$" and "$b$." A voltage is applied across these terminals "$a$" and "$b$" to cause electric current to flow through each of the elements, and then if a voltage appears between the terminal "$e$" which is connected to the output electrode of the reference element 1 and any one of the terminals "$f_1$," "$f_2$," "$f_3$" . . . . which are likewise, connected to the output electrodes of the other elements $1'_1$, $1'_2$, $1'_3$ . . . respectively, it will indicate the presence of a magnetic bubble at the relevant element. More specifically, a magnetic bubble exists at the element whose output electrode provides an output voltage with respect to the output electrode "$e$" of the reference element.

Advantageously, this arrangement of numerous three-terminal elements can be manufactured in the form of integrated circuit as shown in FIGS. 22 and 23. The circuit patterns show that one of the current electrodes of each three-terminal Hall element 1 is connected to a common part, whereas the other current electrodes 3 are separate from each other, thus permitting electric current to each element 1 to be controlled as required.

FIG. 23 shows a pattern of three-terminal Hall elements 1 arranged in a checkerboard pattern. In this array the current electrodes 2, 3 of the elements are connected in common and only the output electrodes 10 of the elements need be independently extended. Therefore, building an array of three-terminal Hall elements to detect magnetic bubbles according to this invention is very easy.

The detecting method as mentioned above can be applied to logic operation of magnetic bubble domains as follows:

Turning to FIG. 17, two three-terminal Hall elements 1 and 1' are connected in parallel to terminals "*a*", "*b*," each element having input electrodes 2, 3 or 2', 3' and output electrodes 10 or 10'. If this parallel connection is subjected to the same magnetic field, no output voltage will appear across output terminals "*e*" and "*f*," which are connected to the output electrodes 10 and 10' of the elements 1, 1'.

However, if one of the elements is subjected to an inverted magnetic field, a voltage proportional to the difference in magnetic field will appear.

With this arrangement a voltage appearing across terminals "*e*" and "*f*" can be used as the logic result of a logic operation of the magnetic bubbles situated in the same positions as the elements 1, 1'. More specifically, if there exists an inverted magnetic bubble $B_d$ in either element, a voltage proportional to the difference will appear, thus permitting performance of EXCLUSIVE OR logic operation of the magnetic bubble on both elements by means of the output voltage. If a D.C. voltage is applied across terminals "*a*" and "*b*," the polarity of output voltage appearing across terminals "*e*" and "*f*" depends on which element is subjected to a magnetic bubble. However, if an A.C. voltage is applied across terminals "*a*" and "*b*," an A.C. output voltage will appear regardless of which element is subjected to an inverted magnetic field, making EXCLUSIVE OR operation possible.

Figures 24, 25, 26:
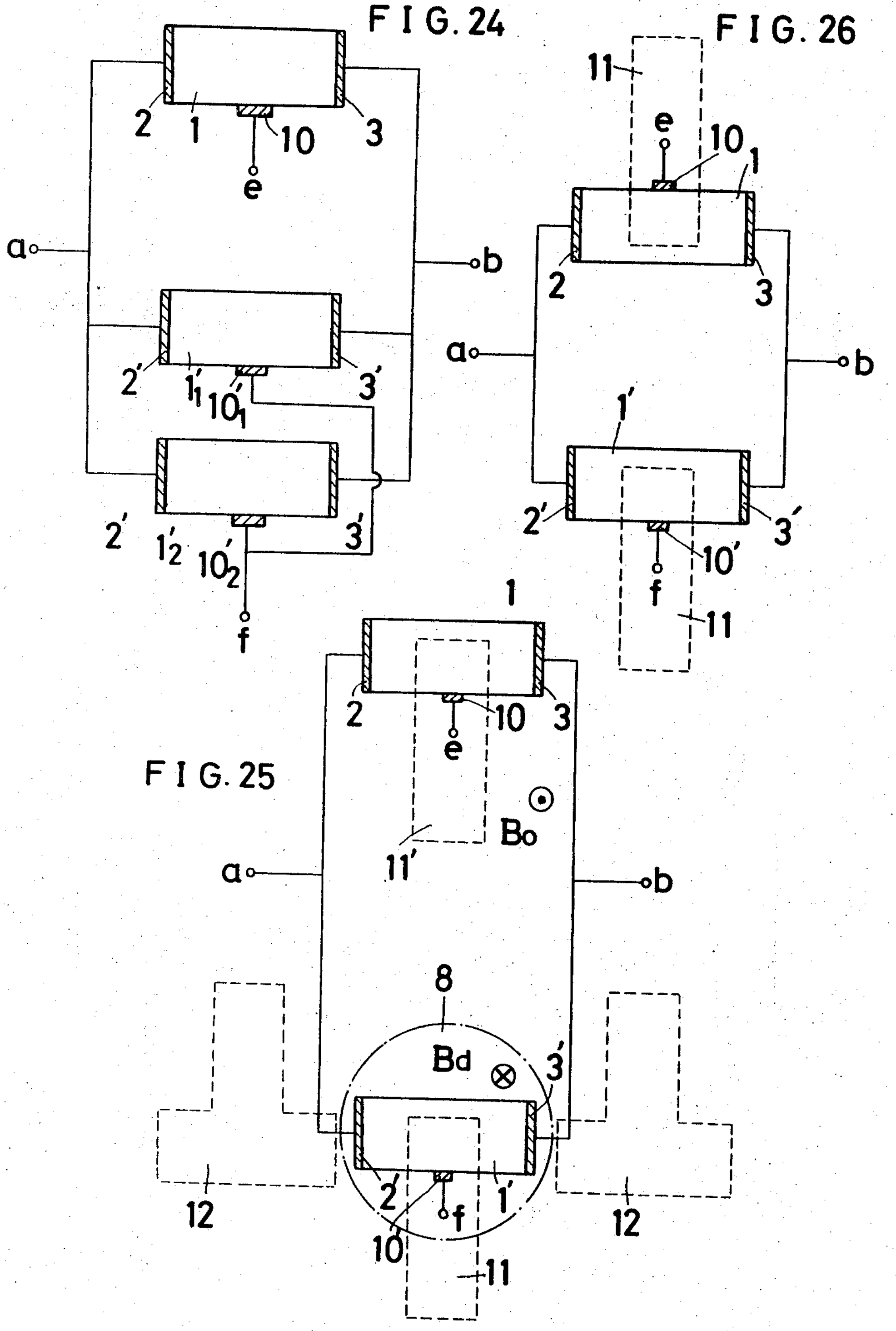
Figure 28:
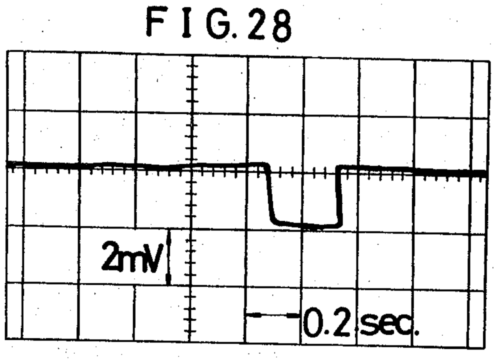
FIG. 28 is an oscillogram showing the detecting characteristics of a three-terminal Hall detector.

Referring to FIG. 24, an OR logic circuit using three three-terminal Hall elements is shown. One of these elements is positioned at a place where no magnetic bubble exists, and if magnetic bubbles appear on the other elements $1'_1$ and $1'_2$, the logic operation of the magnetic bubbles will be performed. The output terminals "*f*" of the elements $1'_1$ and $1'_2$ are connected in common, and therefore the output voltage appearing across terminals "*e*" and "*f*" is the result of the OR logic operation of the magnetic bubbles at the positions of the elements $1'_1$ and $1'_2$. If the output electrode 10 of the element 1 is shifted to the opposite side of the element 1, or otherwise if a magnetic bubble exists constantly at that position, the output voltage across terminals "*e*" and "*f*" will provide the result of NOR of the magnetic bubbles at the positions of the elements $1'_1$ and $1'_2$. The number of the elements used in OR or NOR circuits vary with the number of magnetic bubbles. As a matter of course, logic operations other than OR and NOR will be possible by combining similar Hall elements in suitable arrangement. As mentioned above, the logic operation is performed in the process of magnetic-to-electroc conversion by means of at least two parallel-connected three terminal Hall elements which are put on a magnetic body containing magnetic bubbles.

In actual cases where magnetic bubbles exist in a very thin wafer of garnet or in an epitaxially grown garnet, output signal is likely to appear even in the absence of magnetic bubbles. This is because the detecting elements are positioned on electric wires for driving magnetic bubbles on permalloy patterns, thus detecting not only the magnetic field originating from the magnetic bubble but also the stray magnetic fields caused by electric wires or permalloy patterns magnetized by rotating magnetic field.

The method of eliminating such noises is described as follows:

Turning to FIG. 25, two three-terminal Hall elements 1 and 1' each having a ohmic input electrodes 2, 3 and output electrode 10 applied on a semiconductor body, are parallel-connected to terminals "*a*" and "*b*," the element 1 is positioned at the place where no magnetic bubble appears whereas the element 1' is situated at the place where magnetic bubble may appear. Permalloy patterns 11, 12 for driving magnetic bubbles are provided, and the magnetic bubble 8 is indicated in the form of a circle (broken line). A permalloy 11' similar to that positioned at the element 1' is put at the element 1 where no magnetic bubble appears. Thus, both permalloys 11', 11 will be equally subjected to the same rotary magnetic field for driving magnetic bubbles, and therefore both elements 1 and 1' will be subjected to magnetic fields of equal strength originating from the permalloys thus magnetized by the rotating magnetic field. Accordingly, the noise signal components will be cancelled in the final output signal which is given in the form of the difference between the Hall voltages of the elements 1 and 1' across the terminals "*e*" and "*f*."

FIG. 26 shows a parallel-connection of two three-terminal Hall elements 1 and 1' which are positioned so as to be opposite to each other with respect to the output electrodes therof. In this parallel connection an output voltage will appear in case of the presence or absence of magnetic bubbles both in the elements 'and 1'. Therefore, if the permalloys 11 are positioned in the opposite relation as shown, the noise voltage due to the magnetized permalloys will be cancelled in the final output voltage.

Referring to FIG. 27, two electric conductors 13 are arranged in a symmetrical relation with respect to two three-terminal elements 1, 1' which are connected so as to produce output signals in a differential way. Both electric conductors carry electric currents of equal amount, and therefore both elements 1 and 1' will be subjected to magnetic fields of equal strength caused thereby with the result that no noise appears in the final output voltage.

The above embodiments are described with regard to two elements, but the same idea can be applied to a parallel connection of numerous elements to simultaneously detect different magnetic bubbles.

As is apparent from the above, noise can be completely eliminated and at the same time a high sensitivity can be realized by providing means for magnetic bubble drive of the same characteristics at the positions of the Hall elements which function in a differential way.

The results of the actual measurements are given as follows:

A linear seven bit array detector consisting of the parallel-connection of three-terminal elements as shown in FIG. 18, and a two-dimensional, 18 bit array detector were manufactured in the form of integrated circuit.

The semiconductor body used was of a single crystal of n-type InSb (Resistivity $\rho = 5.5 \times 10^{-3}$ Ωcm, mobility $\mu = 71{,}000$ cm²/Vsec). Each element was 10 μm thick, 60 μm long and 50 μm wide. An extension of the semiconductor material 10 μm in width was provided at the center of the element to serve as the Hall electrode.

In detecting a magnetic bubble (about 100 μm in diameter) in a $YFeO_3$ under the bias magnetic field of 20 oe, an output voltage of about 2.0 mV was obtained at an electric current of 10 mA in each element. FIG, 28 shows the oscillogram of the dynamic detection of magnetic bubble, which was driven by the rotating magnetic field at 2 $H_Z$.

Also, a two-dimensional, 100 bit array (10 × 10) was manufactured. This consisted of three-terminal elements of the same semiconductor material as mentioned above. The dimensions of each element was 50 μm (length) × 40 μm (width) × 5 μm (thickness), and it had a 10 μm electrode extension for the Hall electrode. The input resistance was about 50 Ω. The array detector was used to detect a magnetic bubble in the same $YFeO_3$ as mentioned above. The output voltage produced was about 3 mV at an electric current of 10 mA in each element. The inventor confirmed that by selecting suitable positionings of the Hall terminals with respect to the direction of electric current it was possible to perform AND, OR, EXCLUSIVE OR and other logic operations.

Also, similar two-dimentional array structures were manufactured of vacuum deposited film of InSb. These structures were of the same size as the devices mentioned earlier except for thickness which was about 2 to 3 μm. Output voltages of about 2–3 mV were obtained at electric current of 5 mA in each element.

The magnetic field of the magnetic bubbles detected was about 20 gauss. However, the inventor found that the output voltage would rise to about 10 – 15 mV, if use were made of an orthoferrite which was of good enough quality to generate a magnetic bubble as strong as 100 gauss. This figure is several times as large as the output voltage in the conventional detector.

Figure 29:
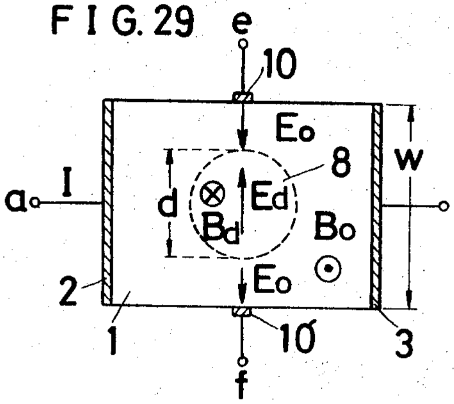
FIG. 29 shows another embodiment using four-terminal Hall elements for detecting uneven magnetic field according to the method of the present invention.

Referring to FIG. 29, the Hall element 1 as shown is about two times as wide as the magnetic bubble domain 8. Assuming that an electric current I is passed through the Hall element, the output voltage $V_{out}$ will be equal to an integral from electrode 10 to electrode 10' of the Hall electric field $E_d$ due to magnetic bubble $B_d$ plus the Hall electric field $E_o$ due to the bias magnetic field. The Hall electric fields $B_d$ and $B_o$ are substantially equal in strength, but are opposite in direction, and therefore, the fields $E_d$ and $E_o$ are substantially equal in absolute value but are opposite in direction.

In view of this and in view that the element "$w$" is twice as wide as the magnetic bubble "$d$" there will appear no output voltage:

$$V_{out} = E_d \cdot d + E_o\,(w - d) = E_o + E_o \cdot d = 0$$

where "$d$" is the diameter of the magnetic bubble and "$w$" *is the width of the element.*

In absence of a magnetic bubble the output voltage will be the Hall voltage for $B_o$, but in presence of a magnetic bubble it will be substantially zero.

According to this invention an element on the order of two times as large as the magnetic bubble to be detected can be used.

The use of relatively large-sized elements is very advantageous in detecting aminute magnetic bubble (for instance, 5 μm in diameter) in garnet, in that the elements are easy to manufacture and the output is large.

Figure 30:
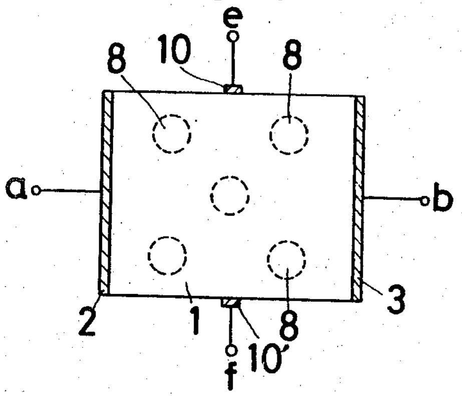
FIG. 30 shows another embodiment using three-terminal Hall elements for detecting uneven magnetic field according to the method of the present invention.

As a matter of course the principle of this invention can be equally applied to detection of a plurality of small magnetic bubbles within a single element as shown in FIG. 30. The Hall voltage will vary with the number of the magnetic bubbles within the element, and therefore the number of magnetic bubbles can be determined.

Figure 31:
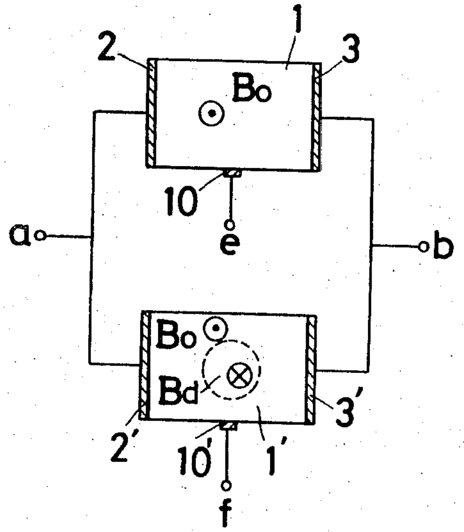

The application of the principle above-mentioned with reference to FIG. 29, is not limited to four-terminal Hall elements, and it still holds for a three-terminal element. FIG. 31 shows an embodiment in which the principle is applied to a parallel-connection of two three-terminal Hall elements 1, 1'. These elements are so connected that they function in such a differential way to produce the difference between the output voltages of the elements as an output voltage across terminals "$e$" and "$f$."

The structural and functional variations discussed above in respect to FIG. 17 to FIG. 27 also apply in this case.

This parallel-combination of three-terminal elements can be equally applied to detection of a plurality of magnetic bubbles.

The results of actual measurements are described as follows:

Elements of variety of dimensions (3 μm in thickness, but ranging from 72 μm to 400 μm in length and from 60 μm to 200 μm in width) were made of an n-type InSb (Resistivity $\rho = 4.7 \times 10^{-3}$ Ωcm, mobility $\mu = 7 + 10^4$ cm²/Vsec). These elements were used to detect magnetic bubbles (about 100 μm in diameter) in a $YFeO_3$ which was subjected to a bias magnetic field of 30 oe. Maximum output voltages were obtained in the elements whose width-to-diameter ratio ($w/d$) ranged from 1.1 to 1.5, and the maximum output voltage was as large as 12 mV at electric current of 30 mA in the element. This figure of the output voltage means that the output voltage for a magnetic bubble of 100 gauss will be 35mV or more, 10 times or 100 times as large as the output voltage in the conventional detector.

The same results could be obtained in case of the array structure composed of three-terminal elements.

Referring to FIG. 32, another embodiment to which a different principle is applied, will be described. According to this principle use is made of a semiconductor of high mobility as a magnetic bubble detector element, and magnetic bubble is detected by the increase in resistance which is caused by the magnetic bubble.

In FIG. 32 a semiconductor element 1 of high mobility has electrodes 2 and 3 on opposite ends. The semiconductor is large, compared with the magnetic bubble 4 to be detected, and therefore the magnetic bubble is within the area of the semiconductor.

Figure 32A:
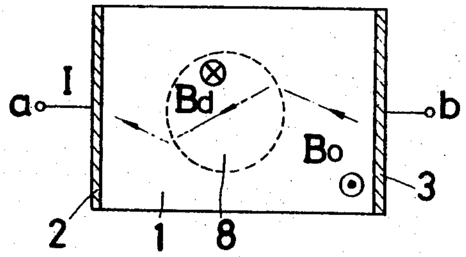
FIGS. 31 and 32 show the principle according to which a variable resistance element detects uneven magnetic field.
Figure 32B:
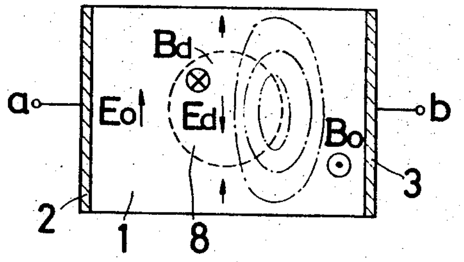

As shown in FIG. 32(A), the bias magnetic field $B_o$ and the magnetic bubble field $B_d$ are opposite in direction.

Under the influence of Hall effect the flow of electric current is changed in direction at the boundary between the magnetic bubble and the bias magnetic field in such a way that the electric current takes a longer path (chain line) with the result that the resistance of the semiconductor is increased. In absence of magnetic bubble the electric current will be put only under the influence of bias magnetic field $B_o$. Therefore, the deviation of electric current is limited to the neighborhood of the electrodes, causing no appreciable increase in resistance. Accordingly the increase in resistance gives an indication of existence of a magnetic bubble.

The Hall effect appearing in the element can be used in a similar way. If a magnetic bubble 8 is within the element 1 carrying electric current I (FIG. 32(B)), the Hall electric field $E_o$ due to the bias magnetic field $B_o$ and the Hall electric field $E_d$ due to the magnetic bubble $B_d$ are opposite in direction. Therefore, eddy currents (chain line) will be generated in the element, thus causing electric power loss. This will result in an increase in resistance between electrodes 2 and 3. Thus, an increase in resistance gives an indication of existence of a magnetic bubble 8.

This principle still holds in all cases where there are one and more magnetic bubbles 8 in the element 1 as shown in FIG. 30. The increased resistance across terminals "*a*" and "*b*" is proportional to the number or size of the magnetic bubbles 8, thus permitting the analog detection of magnetic bubbles. This is very advantageous in reading out the information which is stored in the analog form of magnetic bubbles in a memory.

Figure 33:
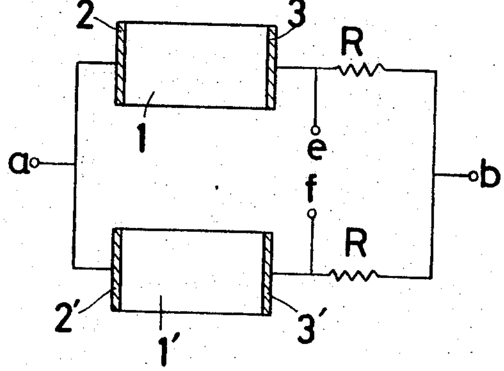
FIG. 33 shows an embodiment using variable resistance elements to perform logic operations according to the method of the present invention.

Referring to FIG. 33, there is shown an embodiment to detect magnetic bubbles at two different positions. This embodiment comprises two elements 1 and 1' parallel-connected via resistors R.

An electric power supply is connected across terminals "*a*" and "*b.*" Only in presence of a magnetic bubble in either element 1, 1' an output voltage will appear across terminals "*e*" and "*f,*" this performing an EXCLUSIVE OR logic operation.

Figure 34:
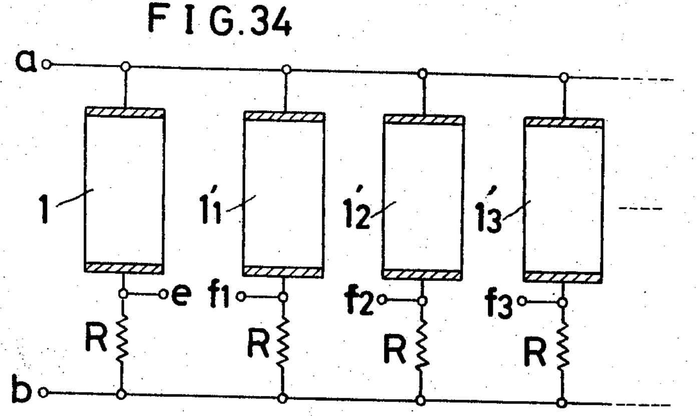
FIG. 34 shows an array pattern of variable resistance elements.

Referring to FIG. 34, a detecting array is shown as being composed of a plurality of elements. Element 1 is positioned at a place where no magnetic bubble will appear whereas the rest of the elements $1'_1$, $1'_2$ . . . . are positioned at the places where magnetic bubbles appear. When an element provides an output voltage between its terminal "*f*" and terminal "*e*," a magnetic bubble is located at the address number of the particular element.

As seen from the above, according to this invention the semiconductor is subjected to the field of magnetic bubble to cause the resistance of the semiconductor to increase, thus detecting the magnetic bubble. The advantage is to permit the use of relatively large semiconductor elements (and hence a corresponding increase of output signal) and to permit the analog detection of the number or size of magnetic bubbles.

Figure 35:
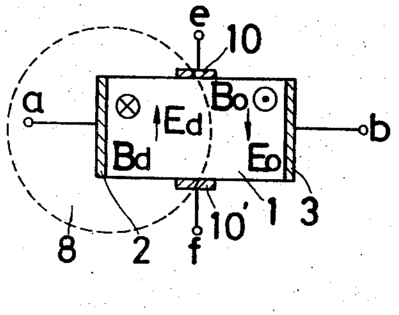
FIG. 35 illustrates detection of a magnetic bubble using a four-terminal Hall element.
Figure 36:
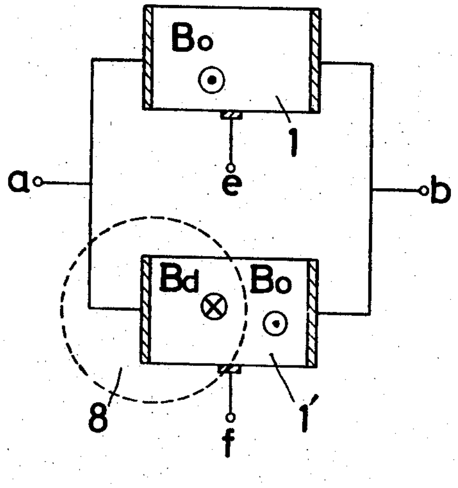
FIG. 36 illustrates detection of a magnetic bubble using a three-terminal Hall element.

Referring to FIG. 35, a magnetic bubble 8 (broken line) cuts across the output electrodes 10, 10' of a four-terminal Hall element 1. The inversion of the magnetic field arises at the boundary, and the strength of the magnetic field is substantially zero along the boundary, and therefore no output voltage will appear. In absence of magnetic bubbles an output voltage due to the bias magnetic field appears. Thus, this embodiment produces output voltage in the same fashion as the embodiment shown in FIG. 29. The above principle can be equally applied to a parallel connection of three-terminal Hall elements.

The results of the actual measurements are described as follows:

Semiconductor elements used were made of n-type InSb; length 60 $\mu$m, width 50 $\mu$m, thickness 5 $\mu$m, and width of a Hall output electrode 5 $\mu$m. The Hall element was used to detect magnetic bubbles in a $YFeO_3$ at the bias magnetic field of 20 oe. In absence of magnetic bubble an output voltage of about 2 mV appeared at a current of 10 mA. When a magnetic bubble appeared in such a way that the boundary of the magnetic bubble domain cuts across the Hall electrodes, no Hall voltage was produced. When no bubble was present, a Hall voltage of 2 mV due to bias magnetic field appeared and thus an output voltage of about 2 mV was obtained as an indication of magnetic bubble.

Figure 37A:
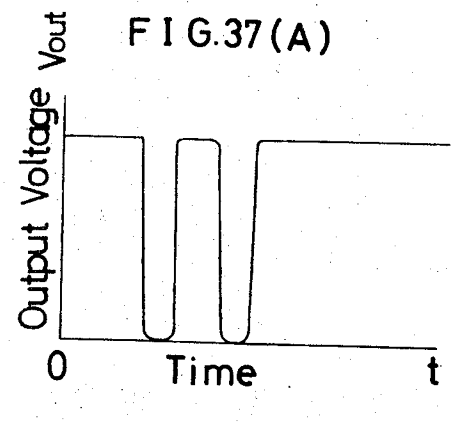
FIG. 37 is a graphic representation of time-vs-output relation in detecting a traveling magnetic bubble according to the method of the present invention.
Figure 37B:
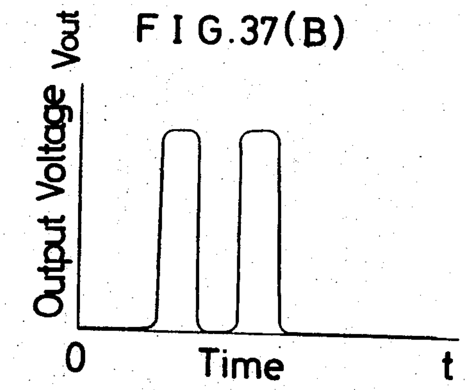

FIG. 37 is a graphic representation of output vs time in detecting a traveling magnetic bubble. FIG. 37(A) and FIG. 37(B) show two typical types output signals.

Although the above description is made in terms of a magnetic bubbles, it should be noted that the principle of this invention holds in all cases where an inversion of magnetic field exists such as in magnetic strip domain device, domain tip device, magnetic tape and magnetic disk.

As mentioned above, the apparatus for detecting uneven magnetic field according to this invention uses the resultant galvanometric effect on a semiconductor device, the effect being caused by magnetic bubble domains and by the magnetic field originating from a magnetic body free from magnetic bubbles, thus permitting the efficient and reliable detection of magnetic bubbles. One of the advantages of this invention is to permit the use of a semiconductor body which is larger than the magnetic bubble to be detected so that consequently the output voltage accordingly increases and the signal-to-noise ratio is substantially improved. Another advantage of this invention is that it makes possible the construction of a two-dimentional array comprising numerous semiconductor elements in the simplest possible structural arrangement. It is therefore easy to build a two-dimentional array of a large number of semiconductor elements capable of simultaneously detecting a plurality of magnetic bubbles without shifting the magnetic bubbles or by shifing them only a short distance, thus finally reducing access time to magnetic bubbles. Additionally, in the course of detection logic operation of magnetic bubbles can be performed.

I claim:

1. A method for electrically detecting an inverted magnetic field which method comprises, disposing at least one semiconductor device having at least two electrodes in a magnetic field, said magnetic field having an inverted magnetic field portion, providing a plasma current in the semiconductor across at least two of said electrodes, causing the plasma current to sweep across the semiconductor device, comfining the sweeping plasma current at the boundary of the inverted magnetic field portion, and determining the position of the inverted magnetic field portion by passing the confined plasma current from said electrodes in the semiconductor device and thereby determining the inverted magnetic field position by the location at which the confined plasma current is removed from the said electrodes.

2. The method of claim 1 wherein the inverted magnetic field comprises at least one magnetic bubble.

3. The method of claim 1 wherein the inverted magnetic field is detected by detecting a change in the plasma current between the electrodes of the semiconductor, said electrodes being on opposite ends of the semiconductor.

4. The method of claim 3 wherein the boundary of the inverted magnetic field is applied to intersect the electrodes on opposite ends of the semiconductor device.

5. The method of claim 2 wherein at least two magnetic bubbles are applied to the semiconductor device.

6. The method of claim 1 wherein the electrodes are ohmic electrodes disposed for injecting electrons and positive holes in the semiconductor device.

7. The method of claim 1 wherein the position of the inverted magnetic field is detected by means of one of a plurality of separated electrodes.

8. The method of claim 1 wherein the inverted magnetic field is detected by reading the change in current across the electrodes of each of a plurality of semiconductor devices.

9. The method of claim 1 wherein a plurality of semiconductor devices are positioned in parallel for determining the position of the inverted magnetic field.

10. The method of claim 1 wherein a plurality of semiconductor devices are positioned to intersect each other for determining the position of the inverted magnetic field.

11. An electrical device for electrically detecting an inverted magnetic field, said device comprising in conbination, at least one semiconductor device having at least two electrodes and disposed in a magnetic field, means for providing an inverted magnetic field portion within the magnetic field, means for providing a plasma current in the semiconductor device across said electrodes means for sweeping plasma current by interaction of the plasma with the magnetic field across the semiconductor until the sweeping plasma current is confined at th boundary of the inverted magnetic field, and one of said leectrode disposed at the location of the confined plasma current at the boundary of the inverted magnetic field, whereby the location of the inverted magnetic field is detected by passing the plasma current to the electrode disposed at the confined plasma location.

12. The electrical device of claim 11 wherein the semiconductor has negative-conductance characteristics of current control type and wherein the at least two of said electrodes are provided on opposite ends thereof.

13. The electrical device of claim 11 wherein the inverted magnetic field comprises at least one magnetic bubble.

14. The electrical device of claim 11 wherein the semiconductor device has high mobility and is provided with input electrodes on opposite ends thereof.

15. The electrical device of claim 12 wherein the electrodes are ohmic electrodes capable of injecting electrons and positive holes.

16. The electrical device of claim 15 wherein an electrode at one end is divided into a plurality of separated electrodes.

17. The electrical device of claim 11 wherein a pluraltiy of semiconductor devices are arranged in an array within the means for applying an inverted magnetic field.

18. The electrical device of claim 16 wherein a plurality of semiconductor devices are arranged in an array within the means for applying an inverted magnetic field.

19. The electrical device of claim 12 wherein a plurality of semiconductor devices are arranged in an array within the means for applying an inverted magnetic field.

20. The electrical device of claim 13 wherein the width of the semiconductor device is greater than the width of the magnetic bubble.

21. The electrical device of claim 11 wherein the semiconductor device is made of high mobility material.

* * * * *